United States Patent [19]

Purvis et al.

[11] 4,436,487

[45] Mar. 13, 1984

[54] FOAM LIQUID CONCENTRATE SUPPLY SYSTEM

[75] Inventors: Fay A. Purvis, Malvern; Robert W. Bennett, Dowingtown; Roger A. Ruth, Glenmoore, all of Pa.

[73] Assignee: Enterra Corporation, Radnor, Pa.

[21] Appl. No.: 393,511

[22] Filed: Jun. 29, 1982

[51] Int. Cl.[3] .................... A62C 35/44; G05D 11/00; F04B 49/08

[52] U.S. Cl. ........................................ 417/46; 169/13; 169/15; 137/100; 137/114; 417/390; 417/442

[58] Field of Search ............... 169/13, 14, 15; 417/46, 417/390, 442, 503; 137/100, 114; 239/61

[56] References Cited

U.S. PATENT DOCUMENTS

| | | | |
|---|---|---|---|
| 2,611,439 | 9/1952 | Faulkner | 169/15 |
| 3,047,003 | 7/1962 | Gurney | 137/114 X |
| 3,811,660 | 5/1974 | Cole, Jr. | 169/15 X |
| 3,853,272 | 12/1974 | Decker et al. | 417/390 X |
| 3,900,043 | 8/1975 | Bowen et al. | 169/13 X |
| 4,246,969 | 1/1981 | McLoughlin | 169/15 X |
| 4,278,132 | 7/1981 | Hostetter | 169/15 X |

FOREIGN PATENT DOCUMENTS

| | | | |
|---|---|---|---|
| 671819 | 7/1979 | U.S.S.R. | 169/15 |

*Primary Examiner*—Leonard E. Smith

*Attorney, Agent, or Firm*—Thompson, Birch, Gauthier & Samuels

[57] ABSTRACT

A system for supplying foam liquid concentrate via a concentrate pump to one or more water pump discharge outlets. The concentrate pump is powered by a variable output hydraulic drive which in turn is automatically modulated independently of the level of operation of the water pump by a control system which is responsive both to the water pressure developed by the water pump and to the foam liquid concentrate pressure developed by the concentrate pump.

10 Claims, 3 Drawing Figures

FOAM LIQUID CONCENTRATE SUPPLY SYSTEM

BACKGROUND OF THE INVENTION

1. Field of the Invention

This invention relates to foam systems for extinguishing hazardous flammable liquid fires.

2. Description of the Prior Art

Conventionally, foam systems of the above-mentioned type have employed fixed displacement pumps for supplying foam liquid concentrate via supply conduits to one or more of the discharge outlets of a water pump. Where the system is truck-mounted, both pumps usually are driven by the truck motor via conventional power take off arrangements. The output pressures of both pumps are kept in balance, either automatically or manually. The concentrate supply conduits lead to pressure drop inducing devices which admit the concentrate into the water pump discharge outlets at flow rates governed by the flow rates of the water being pumped therethrough. Proportioning valves in the concentrate supply conduits operate either to selectively isolate the discharge outlets from the concentrate pump, or to control the amount of foam liquid concentrate being fed thereto.

The concentrate pump has adequate capacity to service all water pump discharge outlets under maximumn flow rate conditions, and it produces a constant output at a given motor RPM. This occurs irrespective of the number of water pump discharge outlets actually being fed with foam liquid concentrate.

This arrangement has certain decided drawbacks when, as is frequently the case, there occurs a simultaneous demand for both water and foam. When this situation is encountered, some of the water pump discharge outlets are fed with foam liquid concentrate in order to generate foam, whereas other water pump discharge outlets are kept isolated from the liquid concentrate pump, thereby enabling such outlets to provide the needed supply of water. The drive motor must necessarily be revved up to an RPM which supplies adequate power to the water pump so that it in turn can supply the needed water flow to all of the discharge outlets in use. The same RPM, however, causes the concentrate pump to develop excess output. Therefore, in order to maintain a balance between water pressure and foam liquid concentrate pressure, the excess output of the concentrate pump is recirculated back to the concentrate storage tank via a diaphragm operated pressure control valve.

The power which is consumed in developing the excess output of the concentrate pump is simply wasted. When liquid foam concentrate is being fed to only a small number of the water pump discharge outlets actually in use, the resulting power loss attributable to recirculation of liquid foam concentrate can be considerable, to the point where it can prevent the motor from driving the water pump at its rated maximum capacity. Moreover, as the foam liquid concentrate is being recirculated, its temperature is increased, and air is entrained. This can be detrimental to the more recently developed foam liquid concentrates, under some circumstances causing pre-foaming and degradation.

SUMMARY OF THE PRESENT INVENTION

A basic objective of the present invention is to avoid the above-mentioned problems by providing an improved system for supplying foam liquid concentrate to the water pump discharge outlets wherein the output of the concentrate pump is controlled in accordance with the demand for liquid concentrate, irrespective of variations in water pump flow rate and operating pressure. This avoids any need to recirculate liquid foam concentrate back to the concentrate storage tank, thereby conserving power while at the same time safeguarding the liquid concentrate from the above mentioned effects of recirculation.

These and other objectives and advantages of the present invention are achieved in a preferred embodiment to be hereinafter described in greater detail by driving the concentrate pump with a variable output hydraulic drive, which in turn is automatically modulated independently of the level of operation of the water pump by a control system responsive both to the water pressure developed by the water pump and to the foam liquid concentrate pressure developed by the concentrate pump.

The system of the present invention also preferably includes a second control means for manually varying the output of the hydraulic drive, with a selector being available at the operator's panel for alternately activating either the manual or automatic modes of operation.

Advantageously, the concentrate pump is mechanically coupled to a hydraulic motor, and the motor in turn is in fluid connection with a variable displacement hydrostatic pump which supplies the motor with pressurized hydraulic fluid drawn from a hydraulic fluid storage tank. The displacement of the hydrostatic pump may be controlled either manually or automatically. The hydrostatic pump may be mechanically connected to the water pump, or it may be driven by any other convenient means, including for example the same motor used to drive the water pump.

Preferably, the system of the present invention also includes a rotary gear charge pump operable to supply pressurized hydraulic fluid to a hydraulic control circuit forming part of the automatic control system. The rotary gear charge pump may be mechanically connected to the variable displacement hydrostatic pump, and both pumps may be driven by the same power source.

Preferably, the hydraulic control circuit includes a fluid pressure responsive adjusting mechanism for varying the displacement of the hydrostatic pump. The adjusting mechanism is supplied with pressurized hydraulic fluid by the rotary gear charge pump. In this arrangement, a servo control module is also connected in the hydraulic control circuit between the rotary gear charge pump and the adjusting mechanism. The servo control module operates to modulate the hydraulic fluid pressure being applied to the adjusting mechanism in response to variations in the water pressure developed by the water pump and the foam liquid concentrate pressure developed by the concentrate pump.

DESCRIPTION OF PREFERRED EMBODIMENT

Figure 1:
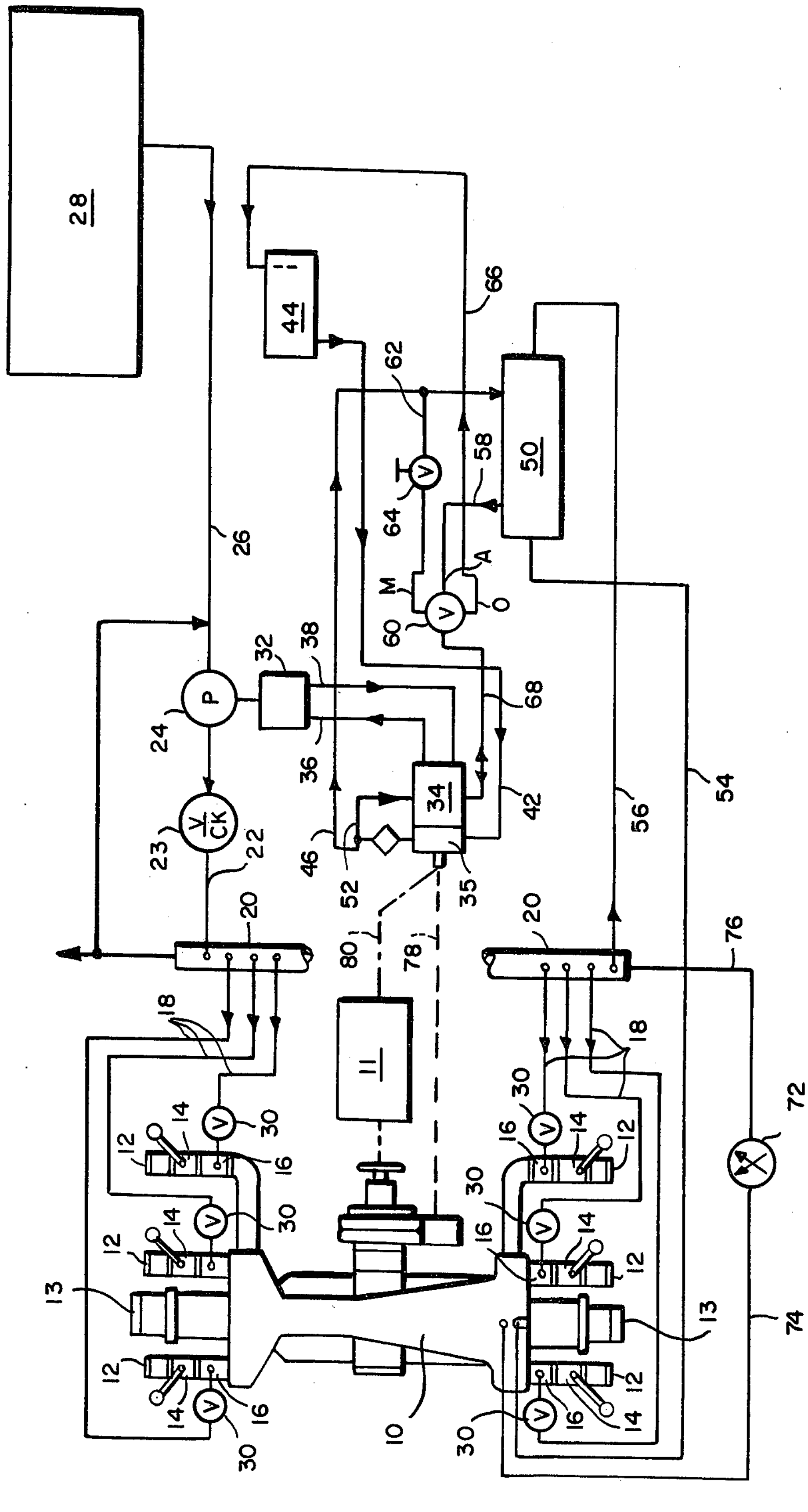
FIG. 1 is a schematic representation of a preferred embodiment of a system in accordance with the present invention.

A preferred embodiment of a system embodying the concepts of the present invention is shown schematically in FIG. 1. A water pump 10 is driven by a motor 11 and is provided with one or more discharge outlets 12 through which water may be pumped after being drawn from any convenient source through one or several suction ports 13.

Each discharge outlet 12 has a shutoff valve 14 and a fluid pressure drop inducing device 16 associated therewith. The valves 14 operate to open and close their respective discharge outlets, and the pressure drop inducing devices 16 operate to admit a foam liquid concentrate into the discharge outlets via feed conduits 18. The pressure drop inducing devices 16 can be of a modified venturi type, or of any other type known to those skilled in the art. Such devices create a lowered pressure zone in the discharge outlets thereby causing foam liquid concentrate to be admitted at flow rates that are directly proportional to the flow rate of the water being pumped therethrough when the valves 14 are open.

The conduits 18 lead to a common manifold 20 which is connected by conduit 22 to a concentrate pump 24. A check valve 23 in conduit 22 prevents reverse flow of liquid from manifold 20 to pump 24. The concentrate pump in turn is connected by conduit 26 to a foam liquid concentrate storage tank 28. Proportioning valves 30 are arranged in the conduits 18 between the fluid pressure drop inducing devices 16 and the manifold 20. When closed, the valves 30 are operable to isolate the pressure drop inducing devices 16 from the concentrate pump 24, and when open to selected settings, the same valves operate to meter the amount of foam liquid concentrate being supplied to the pressure drop inducing devices.

The concentrate pump 24 is powered by a hydraulic drive which includes a hydraulic motor 32 and a variable output hydrostatic pump 34. The hydraulic motor 32 may be of known design, such as for example the "Char-Lynn 4000 Series" manufactured by the Eaton Corporation of Minneapolis, Minn. The hydraulic motor is mechanically coupled to the concentrate pump 24, and is in hydraulic fluid connection via feed and return lines 36, 38 with the hydrostatic pump 34.

Figure 2:
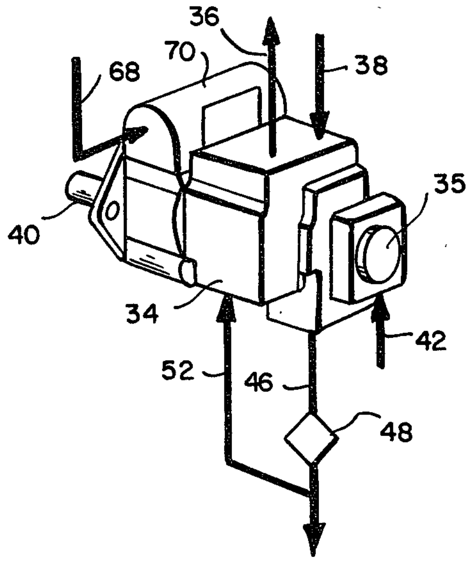
FIG. 2 is a perspective view of a combined variable displacement hydrostatic pump and rotary gear charge pump of the type shown in FIG. 1.
Figure 3:
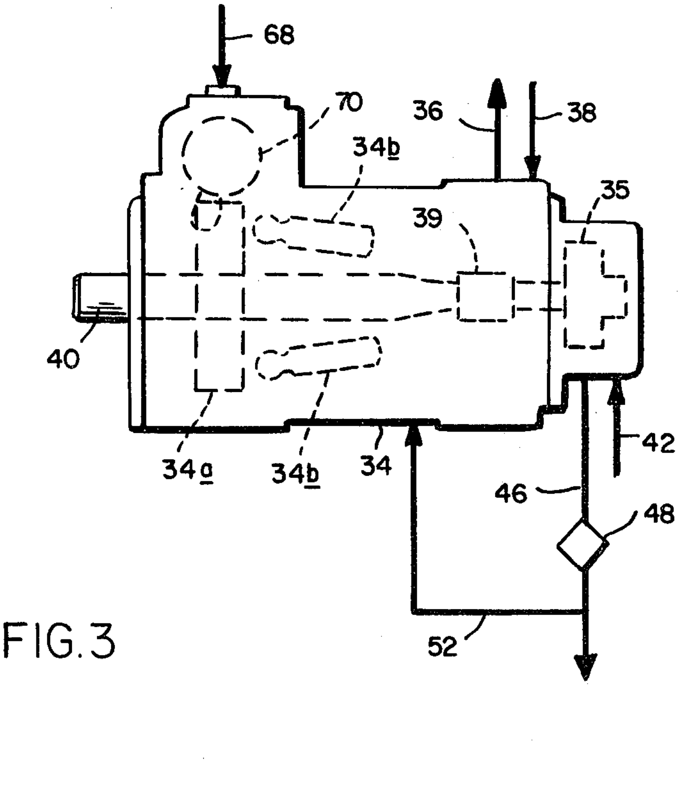
FIG. 3 is a schematic representation of the pump assembly shown in FIG. 2.

The hydrostatic pump 34 also may be of known design, for example the "Series AA4V" pump supplied by the Rexroth Corp. of Wooster, Ohio. With reference to FIGS. 2 and 3, it will be seen that pump 34 includes a rotatable rocker cam swashplate **34*a* arranged to coact with a plurality of inclined pistons 34*b* in developing a displacement or output which varies depending on the inclination of the plate in relation to its rotational axis and the speed at which the pump is being driven. The design and operation of such pumps is well known to those skilled in the art, and hence no further explanation is required. An internal rotary gear charge pump 35 is coupled to the variable displacement pump at 39, and both pumps are driven through a common input shaft 40**.

The rotary gear charge pump 35 is connected via a suction line 42 to a hydraulic fluid reservoir tank 44. The output of the rotary gear charge pump is conducted via a discharge line 46 having a filter 48 therein to a servo control valve 50. A branch conduit 52 leads from discharge conduit 46 back to the pump 34 to provide it with hydraulic charge pressure.

Water pressure is applied to one side of the servo control valve 50 by means of conduit 54 leading from the water pump 10, and liquid foam concentrate pressure is applied to the opposite side of the valve 50 by a conduit 56 leading from the concentrate feed manifold 20. The servo control valve 50 operates in response to both water pressure and foam concentrate pressure to automatically modulate the hydraulic pressure applied to it via conduit 46 and to direct a modified hydraulic control signal via conduit 58 to a manually operable selector valve 60. A branch conduit 62 containing a manually operable control valve 64 leads from conduit 46 to selector valve 60. Another conduit 66 connects the selector valve 60 to the hydraulic fluid reservoir tank 44. The selector valve 60 is connected via conduit 68 to a control cylinder 70 on hydrostatic pump 34. Cylinder 70 operates to vary the inclination of swashplate **34*a* and hence the displacement of pump 34 in response to varying hydraulic control signals routed through selector valve 60 from either the servo control valve 50 during automatic operation, or the manually operable control valve 64 during manual operation. During either automatic or manual operation, the balance between water pressure and liquid foam concentrate pressure may be visually observed on a duplex gauge 72 connected via conduits 74, 76 to the water pump 10 and the concentrate feed manifold 20**.

The combined assembly of the hydrostatic pump 34 and rotary gear charge pump 35 may be driven by any convenient means. For example, as schematically depicted by the dotted line 78 in FIG. 1, this may be accomplished by mechanically connecting the pump assembly directly to the water pump 10. Alternatively, as indicated by dot-dash line in the same view, the pump assembly may be driven by motor 11 via another power take off connection 80. The operation of the system will now be explained.

If foam generation is not required, the selector valve 60 is adjusted to an off position "0" at which hydraulic fluid will be bled from the hydrostatic pump control cylinder 70 back through conduit 68, selector valve 60 and conduit 66 to the reservoir 44. This will allow the swashplate **34*a* to assume a neutral operating condition in which no fluid is being pumped to the hydraulic motor 32. Thus, the concentrate pump 24** will remain inoperative.

If there is a need to generate foam under automatically controlled conditions, the selector valve 60 is adjusted to an automatic control position "A". The hydraulic control signal being generated by the servo control valve 50 then will be directed via conduit 58, valve 60 and conduit 68 to the hydrostatic pump control cylinder 70. As a result of the application of this signal to the control cylinder 70, the inclination of the swashplate **34*a* will be changed and the output of the hydrostatic pump 34 will be automatically elevated and controlled, thereby operating through the hydraulic motor 32 to correspondingly elevate and control the output of the concentrate pump 24. Thus it will be seen that the output of the concentrate pump 24 will be automatically modulated as a function of both water pressure and concentrate pressure. If only a few of the water pump discharge outlets 12 are being fed with liquid foam concentrate via their respective proportioning valves 30, then the output of the concentrate pump will be controlled at a relatively low level which is sufficient to meet the existing demand for foam concentrate. Nevertheless, the desired balance between water pressure and concentrate pressure will be maintained, without requiring any of the concentrate to be recirculated from the discharge side of the concentrate pump back to the storage tank 28. This result will be achieved irrespective of the flow rate and operating pressure of the water pump 10**.

If the system is to be operated manually, the selector valve 60 is adjusted to the manual setting "M". Now, the output of the rotary gear charge pump 35 is directed via conduits 46 and 62, through manual control valve 64, and then on through selector valve 60 and conduit 68 to the control cylinder 70. The operation of the hydrostatic pump 34 and the hydraulic motor 32 and concentrate pump 24 will then be controlled by manual adjustments to valve 64, with the resulting changes to the output pressure of the concentrate pump being observable in comparison to water pump pressure on the duplex gauge 72.

Experience with the system of the present invention has shown that it is possible to maintain a balance between water pressure and foam liquid concentrate pressure of ±1 p.s.i. This in turn makes it possible to operate at lower pressure drops through the inducing devices 16 as compared with conventional systems, and still maintain accurate proportioning ratios.

In light of the foregoing, it will now be apparent to those skilled in the art that changes and modifications may be made to the embodiment herein described. For example, the hydrostatic pump 34 and rotary gear charge pump 35 may be separated and possibly driven by different power sources. Also, the servo control valve 50 might be incorporated as an integral part of the hydrostatic pump 34, with its modulating function being controlled mechanically, again by means responsive to water pressure and foam liquid concentrate pressure. Components may be added to the system in order to provide additional operating modes. Although a hydraulic control circuit has been described, equivalent electrical control circuits might also be devised. While the present invention has been described in connection with the supply of foam liquid concentrate, it is to be understood that the same system could be employed to supply other liquid chemical additives.

It is our intention to cover these and any other changes or modifications which do not depart from the spirit and scope of the invention, and which are encompassed by the claims appended hereto.

We claim:

1. For use with a motor-driven water pump of the type having at least one outlet through which water may be pumped, said outlet having associated therewith a first valve and a fluid pressure drop inducing device, said first valve being operable to open and close said outlet and said pressure drop inducing device being operable to admit a liquid chemical additive into said outlet at a flow rate which is directly proportional to the flow rate of the water being pumped therethrough when said first valve is open, a system for supplying a liquid chemical additive to said pressure drop inducing device, comprising:

- a liquid chemical additive storage tank;
- an additive pump connected respectively by suction and discharge conduits to said storage tank and to said pressure drop inducing device;
- a second valve arranged in said discharge conduit, said second valve being operable when closed to isolate said pressure drop inducing device from said additive pump, and being operable when open to a selected setting to meter the amount of liquid chemical additive supplied to said pressure drop inducing device;
- a variable output hydraulic drive means for powering said additive pump; and
- control means responsive to the water pressure developed by said water pump and to the liquid chemical additive pressure developed by said additive pump for varying the power output of said hydraulic drive means in order to maintain said water pressure and said liquid chemical additive pressure in balance irrespective of changes in water pump flow rate, water pump operating pressure, and the setting of said second valve.

2. For use with motor-driven water pump of the type having a plurality of discharge outlets through which water may be pumped, said discharge outlets each having associated therewith a first valve and a fluid pressure drop inducing device, the first valves being operable to open and close their respective discharge outlets and the fluid pressure drop inducing devices being operable to admit a foam liquid concentrate into their respective discharge outlets at flow rates which are directly proportional to the flow rates of the water being pumped therethrough when their respective first valves are open, a system for supplying foam liquid concentrate to said fluid pressure drop inducing devices, comprising:

- a foam liquid concentrate storage tank;
- a concentrate pump connected respectively by suction and discharge conduits to said storage tank and to each of said fluid pressure drop inducing devices;
- second valves arranged in said discharge conduits, said second valves being operable when closed to isolate said pressure drop inducing devices from said concentrate pump, and being operable when open to selected settings to meter the amount of foam liquid concentrate being supplied to said pressure drop inducing inducing devices;
- a variable output hydraulic drive means for powering said concentrate pump; and
- control means responsive to the water pressure developed by said water pump and to the foam liquid concentrate pressure developed by said concentrate pump for varying the power output of said hydraulic drive means in order to maintain said water pressure and said foam liquid concentrate pressure in balance irrespective of changes in water pump flow rate, water pump operating pressure, and the settings of said second valves.

3. For use with a motor-driven water pump of the type having at least one outlet through which water may be pumped, said outlet having associated therewith a first valve and a fluid pressure drop inducing device, said first valve being operable to open and close said outlet and said pressure drop inducing device being operable to admit a foam liquid concentrate into said outlet at a flow rate which is directly proportional to the flow rate of the water being pumped therethrough when said first valve is open, a system for supplying foam liquid concentrate to said pressure drop inducing device, comprising:

- a foam liquid concentrate storage tank;
- a concentrate pump connected respectively by suction and discharge conduits to said storage tank and to said pressure drop inducing device;

a second valve arranged in said discharge conduit, said second valve being operable when closed to isolate said pressure drop inducing device from said concentrate pump, and being operable when open to a selected setting to meter the amount of foam liquid concentrate being supplied to said pressure drop inducing device;

a variable output hydraulic drive means for powering said concentrate pump; and control means responsive to the water pressure developed by said water pump and to the foam liquid concentrate pressure developed by said concentrate pump for varying the power output of said hydraulic drive means in order to maintain said water pressure and said foam liquid concentrate pressure in balance irrespective of changes in water pump flow rate, water pump operating pressure, and the setting of said second valve.

4. The system of claim 3 further comprising a second control means for manually varying the output of said hydraulic drive means, and selector means for alternatively activating either of said control means.

5. The system of claim 3 wherein said hydraulic drive means comprises a hydraulic motor mechanically coupled to said concentrate pump, a hydraulic fluid reservoir, a hydrostatic pump connected between said reservoir and said hydraulic motor and being operable to supply hydraulic fluid under pressure to said hydraulic motor, said hydrostatic pump having a variable displacement controlled by said control means, and means for driving said hydrostatic pump.

6. The system of claim 5 wherein said hydrostatic pump is mechanically connected to said water pump, and wherein both said water pump and said hydrostatic pump are powered by the same motor.

7. The system of claim 5 further comprising a rotary gear charge pump mechanically connected to said hydrostatic pump, said rotary gear charge pump being operable to supply pressurized hydraulic fluid to a hydraulic control circuit forming part of said control means.

8. The system of claim 7 wherein said control means includes a fluid pressure responsive device for varying the displacement of said hydrostatic pump, said device being connected in said hydraulic control circuit and being supplied with pressurized hydraulic fluid by said rotary gear charge pump, and a servo control module connected in said hydraulic control circuit between said rotary gear charge pump and said fluid pressure responsive device, said servo control module being operable to modulate the hydraulic fluid pressure being applied to said fluid pressure responsive device in response to variations in the water pressure being developed by said water pump and the foam liquid concentrate pressure being developed by said concentrate pump.

9. The system of claim 5 wherein said hydrostatic pump is mechanically connected to and driven by the motor driving said water pump.

10. The system of either claims 5 or 9 wherein all recited components are carried on a vehicle, and said motor is also employed to drive said vehicle.

* * * * *